UNITED STATES PATENT OFFICE.

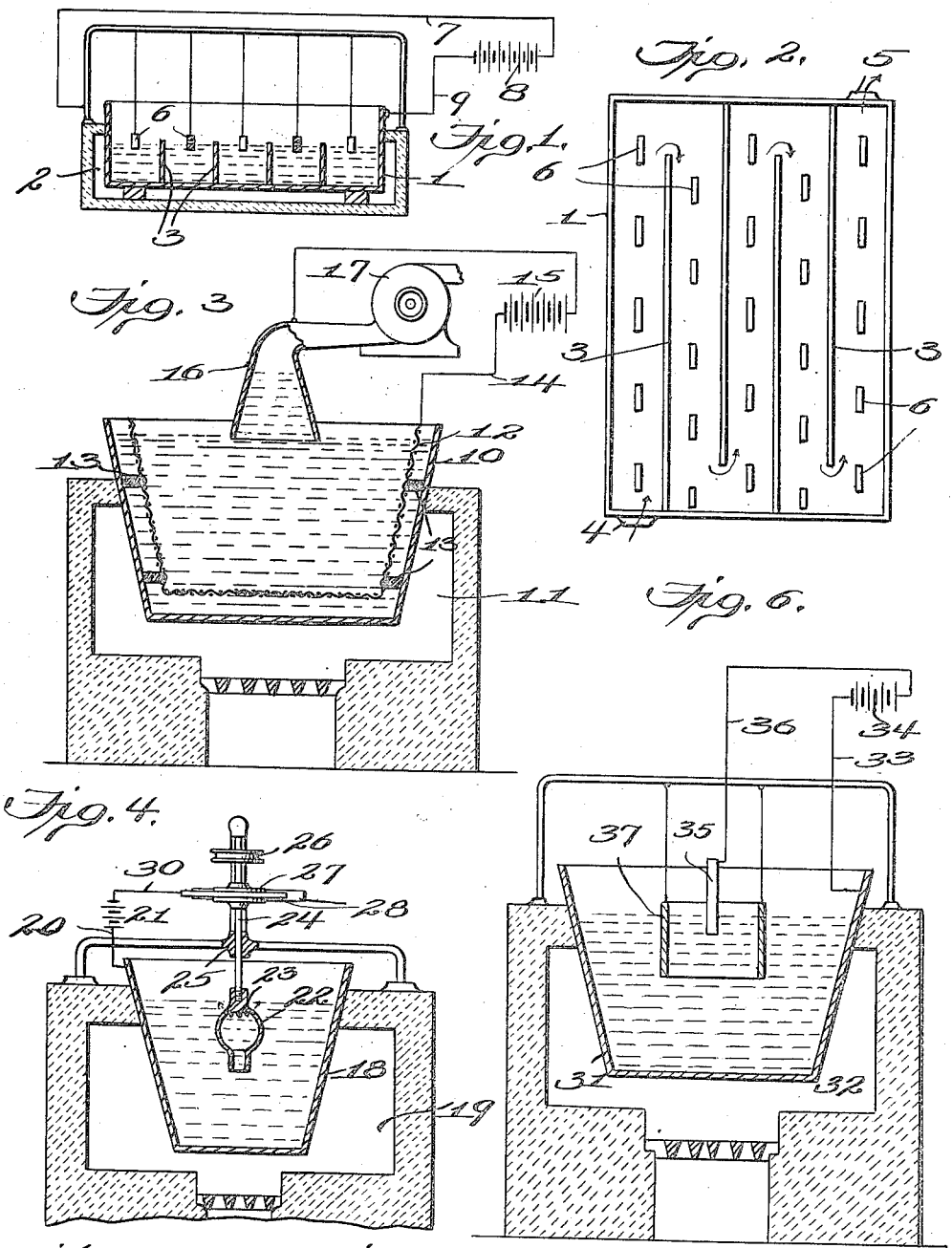

HERMAN B. KIPPER, OF SOLVAY, NEW YORK.

PROCESS OF MAKING CAUSTIC SODA.

1,227,453.     Specification of Letters Patent.     Patented May 22, 1917.

Application filed March 31, 1915. Serial No. 18,888.

*To all whom it may concern:*

Be it known that I, HERMAN E. KIPPER, a citizen of the United States, residing at Solvay, township of Geddes, in the county of Onondaga and State of New York, have invented new and useful Improvements in Processes of Making Caustic Soda, of which the following is a specification.

My present invention relates to improvements in the art of manufacturing caustic soda, and its objects are to provide a method or process of purifying electrolytically strong solutions of caustic soda to eliminate therefrom such metallic impurities as may have been introduced into the caustic soda during the manufacture thereof, and to prevent electrolytically corrosion of the vessels in which the caustic soda is evaporated, either of these results being attained separately or both simultaneously.

The present invention is applicable generally to the different processes now known or used for the manufacture of caustic soda. For example, in the well known "lime-soda" process, the caustic soda is manufactured from sodium carbonate and lime, these constituents being caused to react on one another in aqueous solution to form sodium hydrate or caustic soda and calcium carbonate. The calcium carbonate during the process precipitates out, it is filtered off, and the dilute solution of caustic soda is evaporated first in vacuum pans to a concentration of between 50% and 60% sodium oxid, and it is finally evaporated in open vessels or pots, usually of cast-iron, in which practically all the water is driven off. Dilute solutions of caustic soda obtained from various electrolytic processes of manufacture are similarly evaporated, first, in vacuum pans, and finally in open evaporating vessels. Experience has demonstrated that, during the process of causticization and of evaporation in the vacuum pans, as well as during evaporation in the open or cast-iron pots, appreciable amounts of metals are dissolved off from the sides of the evaporating pans or vessels by the caustic soda. These metallic constituents, owing to their foreign nature and the color which they give, are regarded as impurities in the finished caustic and require elimination so far as possible before the caustic can be marketed. It has been common heretofore to remove these impurities from the caustic soda by settling, the soda being heated to a high temperature (probably as high as 500° C.) in the cast-iron pots, and while the caustic soda is in this fused and very limpid state, the fire below the pot is removed and the caustic soda allowed to cool gradually. The impurities, such, for example, as iron oxid, settle to the bottom of the pot, and when the caustic soda has been cooled to nearly its fusion point, the upper layers thereof are bailed off as the high-grade market caustic, and the lower layers or "bottoms" which contain the impurities are sold as "seconds".

According to the present invention, the initial steps of the process of manufacturing the caustic soda, whether of the lime-soda process or of one of the electrolytic processes, are carried out as heretofore. The caustic liquors from the vacuum pans are, however, at this intermediate stage of the process electrolytically freed from metallic impurities while the liquor is at a temperature ranging as high as 175° C. The caustic liquors thus purified are subsequently evaporated to complete dehydration either in metal pans (which are of a character which will not be attacked by the caustic soda) or in steel pans. The present invention provides a mode of preventing electrolytically corrosion of the vessel when the same is made of iron or steel or a material subject to attack by the caustic soda.

In order to satisfactorily accomplish electrolytic purification of the caustic, an anodic material must be selected which will be capable of withstanding the attack of the fused caustic at the high temperatures used and will also not be acted upon or at most very slightly by the electric current. Nickel has been found suitable as the anodic material. It has also been found that very low voltages of electric current are sufficient to insure the passage of the current through both the fused caustic and through the hot caustic before complete dehydration. A current density of 50 to 150 milli-amperes per square inch is preferably employed on the walls of the evaporating or purifying vessel, and with such density the metallic content of the purified caustic has been reduced to a very small fraction of 1%.

Apparatus of different kinds may be used in carrying the invention into practice. Different forms of apparatus are shown in the accompanying drawings, wherein—

Figure 1 represents a vertical transverse section;

Fig. 2 a top plan view of a shallow baffled evaporating pan equipped with anodes;

Fig. 3 represents a vertical section of an evaporating pot having a novel form of anode and provided with a diaphragm or lining to prevent any metal from the sides of the pot or vessel entering the caustic liquor;

Fig. 4 is a view similar to Fig. 3 showing a revolving anode which serves as a stirrer;

Fig. 5 is a detail view showing the manner of conducting the current to the revolving anode, as shown in Fig. 4;

Fig. 6 is a view similar to Fig. 3 showing a shield or sleeve surrounding the anode to prevent oxygen from entering the body proper of the caustic liquor.

In Figs. 1 and 2 is shown apparatus for purifying electrolytically caustic soda solutions, it comprising an evaporating pan 1 which is open-topped and is composed of metal suitable to serve as the cathode, the pan being set in a flue or fire-box 2 whereby heat may be applied to raise the temperature of the caustic liquor in the pan to the appropriate point. The pan is provided interiorly with a suitable number of baffles 3 which connect alternately with the respective ends of the pan to provide a zigzag or tortuous course for the flow of the caustic liquor, the latter entering the pan at 4 and discharging therefrom at 5. Anodes 6 are supported in the caustic liquor in the passages formed between the baffles, these anodes being connected by the wire 7 to one side of the battery or source of electric current supply 8 while the opposite side of the battery or source of electric current supply is connected by the wire 9 to the vessel 1 serving as the cathode.

In the construction shown in Fig. 3, 10 designates the purification vessel for the fused caustic soda, it being shown in the form of an open-topped pot which may be composed of iron, the pot being set in a fire-box 11 whereby heat may be applied to raise the temperature of the caustic liquor therein to the appropriate point. In order to prevent metal from the sides of the pot from entering the caustic liquor therein, a diaphragm or lining 12 of fine wire gauze or semi-permeable structure is arranged within the pot and is supported from the inner wall thereof at appropriate points by insulators 13, the space between the semi-permeable diaphragm or lining and the wall of the pot being filled with powdered limestone. The semi-permeable diaphragm or lining is preferably composed of nickel gauze and it is insulated from the pot 10 and is connected by the wire 14 to one pole of the battery or source of electric current supply 15. The anode in this construction is in the form of a cone 16 composed preferably of sheet nickel, the bottom or larger end of the cone being immersed slightly below the level of the caustic liquor in the pot, and the upper end of the conical anode is connected to a vacuum or exhaust pump 17 which, in the operation of the apparatus, serves to maintain a slight vacuum within the anode. In this way, the caustic liquor is forced up into the anode, the greater portion of the electrical action takes place within the hollow or conical anode, and all oxygen given off in consequence thereof rises through the liquor contained in the cone and is carried off by the vacuum or exhaust pump.

In the construction shown in Fig. 4, which is adapted for the purification of fused caustic soda, the pot 18 is, as before, set in a fire-box 19 and it is connected by the wire 20 to one pole of the battery or source of electric current supply 21, the pot serving as the cathode, and a hollow revolving anode 22 is employed which is submerged in the caustic liquor and is provided with vents 23 through which the oxygen generated within the hollow anode may escape to the surface of the caustic liquor. This revolving anode also serves as a stirrer, stirring of the caustic solution being necessary in order to obtain even, smooth-surface deposits of the metallic impurities. Such stirring occurs naturally when the caustic liquor is at the boil, that is to say, during evaporation, but during the purification of the 50% to 60% caustic liquor at temperatures of 80° to 130° C., this rotating anode is employed to effect the necessary stirring. This rotating anode may be supported and driven in any suitable way. In the present instance, it is mounted on a vertical shaft 24 which is journaled in suitable bearings 25, it having a driving pulley 26 by which rotary motion may be imparted thereto, and a conducting ring or collar 27 is mounted on the shaft and arranged to coöperate with brushes 28, the latter being held in electrical contact with the opposite sides of the conducting ring or collar by a spring 29, and these brushes are connected by the wire 30 to the opposite side of the battery or source of electric current supply 21.

The apparatus shown in Fig. 6, which is adapted for the purification of fused caustic soda, is also adapted to prevent the anodic oxygen from entering the caustic liquor. In this case, the pot 31, for example of iron or steel, is, as before, set in a fire-box 32 and serves as the cathode, it being connected by the wire 33 to one pole of the battery or source of electric current supply 34, while 35 represents the anode which is connected by the wire 36 to the opposite pole of the battery or source of electric current supply. In this instance, a shield, preferably in the form of a sleeve or shell 37 composed of nickel, is supported or suspended in a position to surround the anode 35 and it dips to a suitable extent into the caustic liquor. In this instance, a relatively large anodic surface is employed with a very low current density, and in operating the apparatus, the oxygen formed at the anode is prevented by the shield or protector from entering the body proper of the caustic solution, the oxygen rising from the anode within the shield or protector and then escaping from the solution.

In carrying out the invention with the use of any of the forms of apparatus shown, the strong solutions of caustic soda are freed of such metallic impurities as may have been introduced therein, and corrosion of the evaporating vessels is prevented electrolytically. It is to be understood that the electrolytic action is employed not for the actual manufacture of caustic soda, as, for example, from sodium chlorid, but merely to purify the caustic and to keep it purified or free from metallic impurities during the evaporation process. The actual formation of the solution of caustic soda may be effected by the well known "lime-soda" process or by any of the several electrolytic processes now in use. In the wet electrolytic processes for the manufacture of caustic soda or caustic potash, the decomposition of salts of sodium and potassium, such as sodium or potassium chlorid, is effected electrolytically to form the solution of caustic soda or potash, or, in other words, the solutions of the salts of sodium or potassium are subjected to electrolysis to produce sodium or potassium hydrate. According to the present invention, however, the electrolytic action is employed not to actually produce sodium or potassium hydrate, as heretofore, but merely to free the solution from metallic impurities.

I claim as my invention:—

1. The herein described method of purifying caustic soda solutions of metallic impurities, which comprises subjecting such solutions, during concentration thereof, to electrolysis to liberate and remove oxygen directly therefrom and precipitate the metal.

2. The herein described method of purifying caustic soda solutions of metallic impurities, which comprises subjecting the solution to electrolytic action and freeing the oxygen formed at the anode directly from the solution and without entering the body proper thereof.

3. The herein described method of purifying caustic soda solutions of metallic impurities, which comprises subjecting such solution to electrolytic action and confining the oxygen generated at the anode by the current to the immediate zone of the anode to prevent such oxygen entering the body of the solution.

4. The herein described method of purifying caustic soda solutions of metallic impurities, which comprises subjecting such solution to electrolytic action and withdrawing the oxygen generated at the anode by the current without permitting such oxygen to enter the body of the solution.

5. The herein described improvement in the art of purifying caustic soda solutions of metallic impurities, which comprises subjecting such solution to electrolysis with a steel cathode, excluding from the solution metal flaking off the walls of the vessel, and withdrawing the oxygen formed at the anode by the current without entering the body of the solution.

6. The herein described method of purifying from metallic impurities, solutions of caustic soda containing from 50% to 60% sodium oxid at temperatures of from 80° to 175° C. which comprises subjecting such a solution to electrolysis, liberating the oxygen at the anode and removing such oxygen directly from the solution, and causing precipitation of the metal composing the impurities.

In testimony whereof I have hereunto set my hand in presence of two subscribing witnesses.

HERMAN B. KIPPER.

Witnesses:
C. A. BATEMAN,
CHAS. S. HYER.